US008788836B1

(12) United States Patent
Hernacki et al.

(10) Patent No.: US 8,788,836 B1
(45) Date of Patent: Jul. 22, 2014

(54) METHOD AND APPARATUS FOR PROVIDING IDENTITY CLAIM VALIDATION

(75) Inventors: Brian Hernacki, San Carlos, CA (US); Sourabh Satish, Fremont, CA (US); Timothy G. Brown, Ballston Spa, NY (US)

(73) Assignee: Symantec Corporation, Mountain View, CA (US)

( * ) Notice: Subject to any disclaimer, the term of this patent is extended or adjusted under 35 U.S.C. 154(b) by 1912 days.

(21) Appl. No.: 11/644,579

(22) Filed: Dec. 22, 2006

(51) Int. Cl.
*G06F 21/00* (2013.01)

(52) U.S. Cl.
USPC .............. 713/185; 713/155; 726/1; 726/26; 726/28

(58) Field of Classification Search
USPC ...................................... 726/26, 28
See application file for complete search history.

(56) References Cited

U.S. PATENT DOCUMENTS

| 7,124,302 | B2 * | 10/2006 | Ginter et al. | 713/189 |
| 7,865,931 | B1 * | 1/2011 | Stone et al. | 726/1 |
| 2003/0229783 | A1 * | 12/2003 | Hardt | 713/155 |
| 2007/0143860 | A1 * | 6/2007 | Hardt | 726/28 |
| 2008/0224823 | A1 * | 9/2008 | Lawson et al. | 340/5.8 |

OTHER PUBLICATIONS

Rose et al., "Structure and Identification of management information for TCP/IP-based Internets," Network Working Group RFC 1155, May 1990.*
Hayashi et al., "A New Source Coding Method Based on LZW Adopting the Least Recently Used Deletion Heuristic", IEEE Pacific Rim Conference on Communications, Computers and Signal Processing, pp. 190-193 vol. 1, May 19, 1993.*

* cited by examiner

*Primary Examiner* — Jason Lee
(74) *Attorney, Agent, or Firm* — Wilmer Cutler Pickering Hale and Dorr LLP

(57) ABSTRACT

A method and apparatus for providing claim validation without storing user information within the IDM system. During enrollment, the IDM system creates a hash representative of the identification information provided by a user. The user information is discarded, i.e., not stored within the IDM system. Only a hash representing that information is stored within the system. Upon a user providing information to a service provider, the service provider requests that the user's information be authenticated by a third party IDS system. The service provider will request such authentication from the IDM system identified by the user. The IDM system generates, from the user's information that was provided to the service provider, a signed token that is sent to the user for use by the user to access the service provider's services. In this manner, the IDM system does not store identification information of the user. Yet, the IDM system provides identification validation services to any service provider requesting such services to ensure that a user is authentic.

12 Claims, 3 Drawing Sheets

METHOD AND APPARATUS FOR PROVIDING IDENTITY CLAIM VALIDATION

BACKGROUND OF THE INVENTION

1. Field of the Invention

Embodiments of the present invention generally relate to identification information validation and, more particularly, to a method and apparatus for validating identification information without storing user identification information within an identification management system.

2. Description of the Related Art

In using various services available through the Internet, a user's identification many times, needs to be validated before providing certain information or services to the user or other requester. Upon a user providing user identification information, i.e., an identity claim, the service provider requests validation of the claim using a third-party identification management (IDM) system. The third-party IDM system is provided the identity claim to enable the IDM system to validate that the user information is correct. Such validation is generally facilitated by the user initially performing an enrollment function that collects the user's identification information that will be used to access services on the Internet. This information is generally encrypted and stored within the IDM system. Such storage of large quantities of user information presents a substantial liability risk to the third-party IDM system. Compromise of the security of the IDM system would be disastrous to the IDM system business as well as result in a compromise of the user information of many users.

To avoid storing substantial amounts of user identification information, some IDM systems require the user to provide identification information each time a transaction with a service provider is to be conducted. Although the user's information is not stored, a substantial amount of time is required to validate a user's information at each transaction. Furthermore, the cost of performing a validation at each service provider transaction is generally borne by the IDM system owner which increases the cost of providing IDM services.

Therefore, there is a need in the art for a method and apparatus of providing secure, rapid, and cost-efficient claim validation.

SUMMARY OF THE INVENTION

The present invention generally is a method and apparatus for providing claim validation without storing user information within the IDM system. During enrollment, the IDM system creates a hash representative of the identification information provided by a user. The user information is discarded, i.e., not stored within the IDM system. Only a hash representing that information is stored within the system. Upon a user providing information to a service provider, the service provider requests that the user's information be authenticated by a third party IDM system. The service provider will request such authentication from the IDM system identified by the user. The IDM system generates, from the user's information that was provided to the service provider, a signed token that is sent to the user for use by the user to access the service provider's services. In this manner, the IDM system does not store identification information of the user. Yet, the IDM system provides identification validation services to any service provider requesting such services to ensure that a user is authentic.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
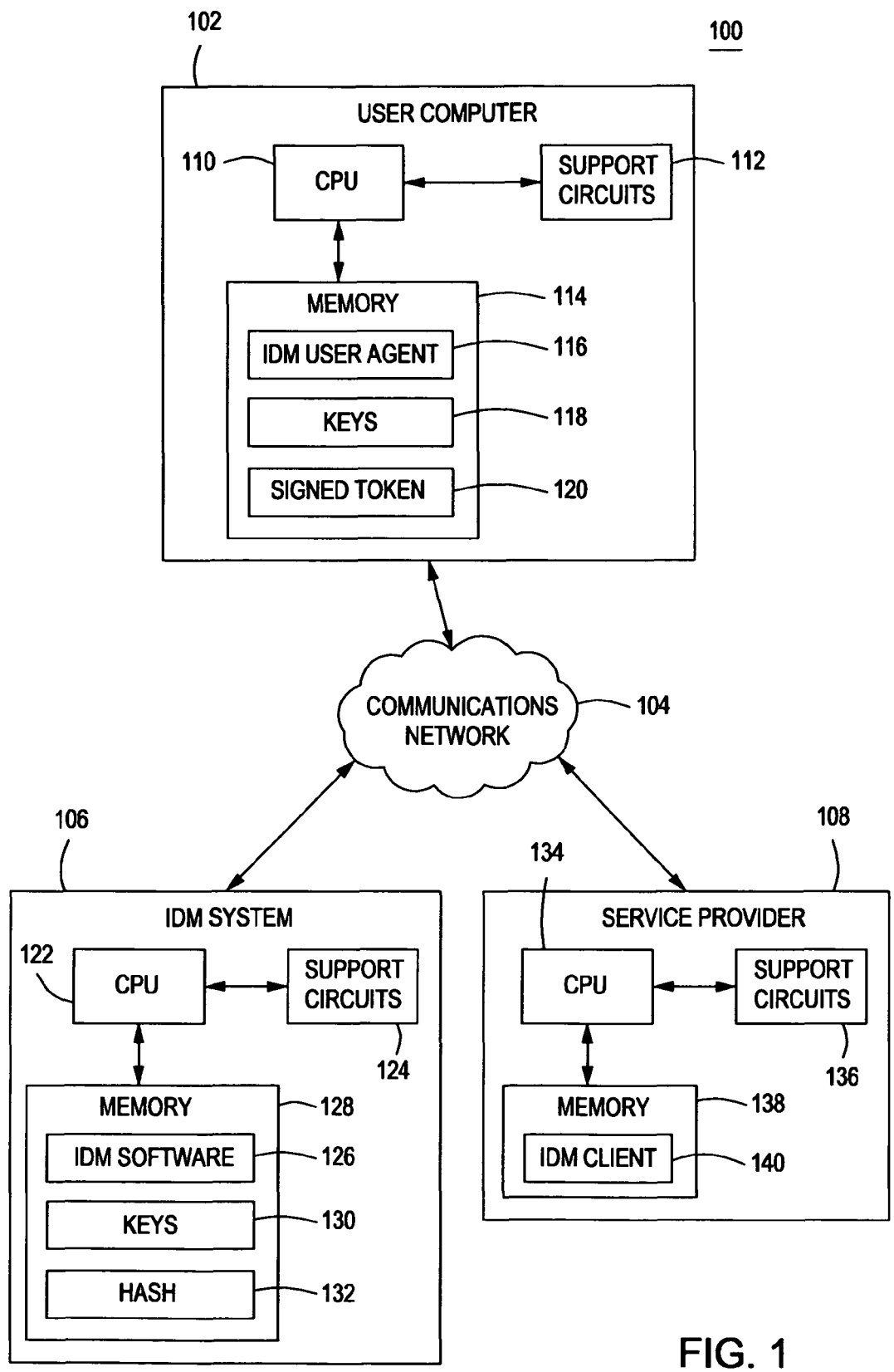
FIG. 1 depicts a block diagram of a system utilizing an IDM system in accordance with the present invention.

FIG. 1 depicts a computer network 100 comprising a user computer 102 an identification management (IDM) system 106, a service provider 108 and a communications network 104 interconnecting the user computer 102, the IDM system 106, and the service provider 108.

The user computer 102 comprises a central processing unit 110, support circuits 112, and a memory 114. The CPU 110 may be one or more of any commercially available microprocessors or microcontrollers. The support circuits 112 comprise circuits and devices that are used in support of the operation of the CPU 110. Such support circuits, for example, include cache, input/output circuits, network interface cards, device drivers, power supplies, clock circuits, and the like. The memory 114 may be one or more of any memory used for storing digital information including random access memory, read-only memory, removable storage, disk drives, optical storage, flash memory, and the like. Various types of software and information are stored within memory 114. The software is accessed and executed by the CPU 110 to support the present invention. The memory 114 stores at least an IDM user agent 116, certain encryption keys 118, and at least one signed token 120. The user computer 102 communicates with the service provider 108 and the IDM system 106 via a communications network 104.

The communications network 104 may be any one of many communication networks or combination of networks that are available to communicate information from a user computer to other computers attached to the network. Such a network 104 is generally forms a portion of the Internet which comprises various sub-networks such as Ethernet networks, local area networks, wide area networks, wireless networks, and the like. To validate claim information provided by the user computer 102, an IDM system 106 is provided.

The IDM system 106 comprises a CPU 122, support circuits 124, and memory 126. The CPU 122 of the IDM system 106 comprises at least one commercially available microprocessor and/or microcontroller. The support circuits 124 comprise devices and circuits that are used to facilitate operation of the CPU 122. Such support circuits are well-known and, for example, include power supplies, clock circuits, cache, input/output circuits, network interface cards, device drivers, and the like. The memory 126 may be any form of digital memory used to store digital information and software. For example, the memory 126 may be a combination of random access memory, read-only memory, removable storage, flash memory, disk drives, optical memory, and the like. The memory 126 stores software in accordance with the present invention including IDM software 128, certain encryption keys 130, and information hash files 132.

The service provider 108 is a well-known provider of certain information or network services. These services are provided via the Internet to at least one user computers 102. To facilitate access by an authorized user, the service provider utilizes the IDM system 106 to authenticate and validate user identification information that is provided by the user computer 102. The service provider 108 comprises a CPU 134, support circuits 136, and memory 138. The CPU 134 may comprise one or more commercially available microprocessors and/or microcontrollers. The support circuits 136 are used to facilitate operation of the CPU 134. The support circuits may include, for example, clock circuits, power supplies, input/output circuits, cache, device drivers, and the like. The memory 138 may be one of a combination of memories including random access memory, read-only memory, flash memory, disk drives, optical memory, removable storage, and the like. The memory 138, in accordance with the present invention, stores an IDM client 140 that is executed by the CPU 134 to request certain user authentication and validation services from the IDM system 106.

To begin using the IDM system 106, the user must enroll by providing certain personal and identification information to the IDM system 106 such that the IDM system 106 can build a profile of the user. When the user provides certain information to service providers 108 in the form of an identity claim, the IDM system 106 will be able to validate the claim and authenticate that the user is the correct user. The enrollment process can be repeated to add more information such that additional claims can be made by the user to one or more service providers.

Figure 2:
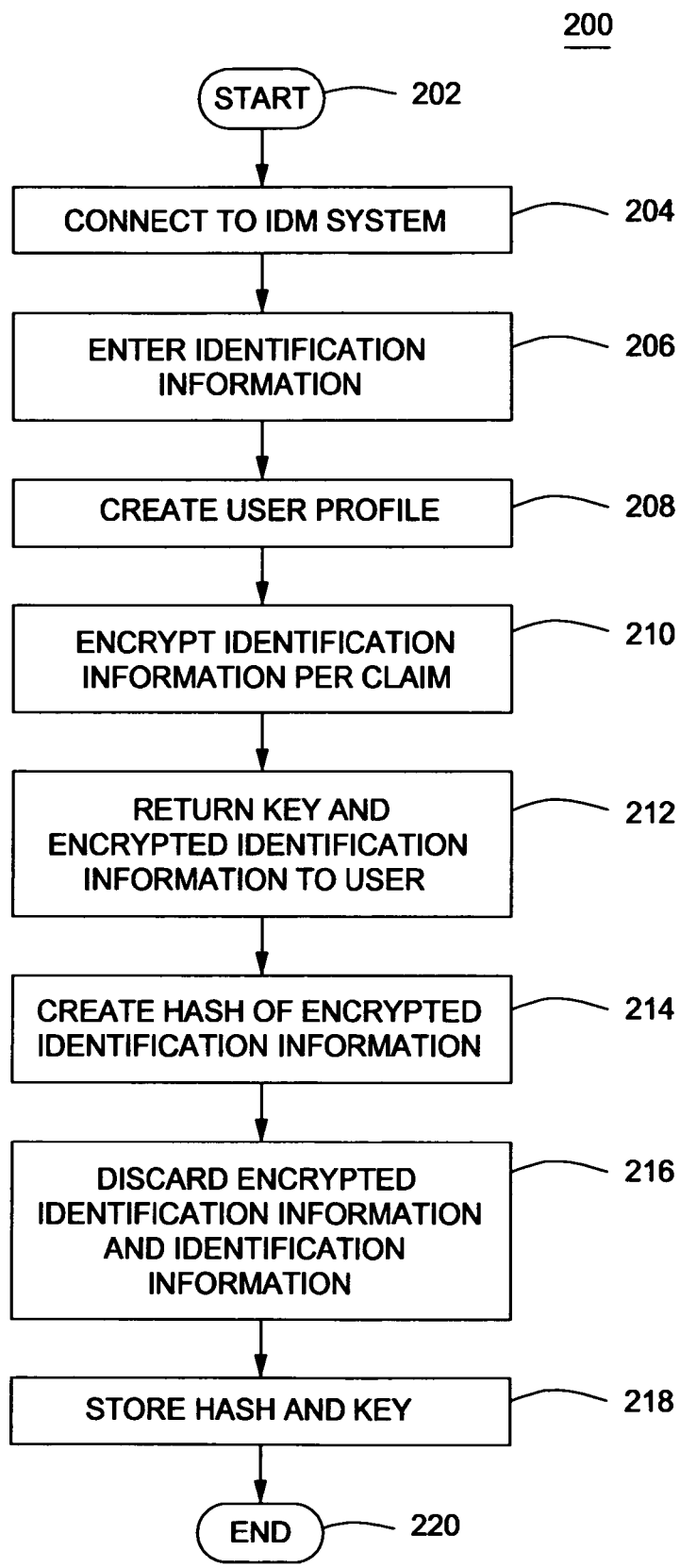
FIG. 2 depicts a flow diagram of an enrollment process used by the IDM system of FIG. 1.

FIG. 2 depicts a flow diagram of a method 200 of enrollment of a user into the IDM system 106 of FIG. 1. The method 200 starts at step 202 and continues to step 204, where the user computer connects to the IDM system via the communications network. Such connection is generally provided by a login and password system. At step 206, the user enters their identification information that will be used to form claims in accessing various service providers. This information may include user name, date of birth, address, age, mother's maiden name, social security number, credit card numbers, driver's license number and the like. At step 208, the IDM system creates a user profile using the identification information. The identity claims may be validated separately by the identification management system (or a third party) to ensure that the user identification information is correct and authentic. Such validation may occur using a cooperative system as disclosed in U.S. patent application Ser. No. 11/644,539, filed simultaneously herewith, which is incorporated herein by reference in its entirety. Verification may occur by contacting various trusted authorities that will verify the veracity of certain claims within the identification information provided by the user. For example, driver's license information, date of birth information, address information, Social Security number information, are generally authenticated by contacting the appropriate government agency.

At step 210, the identification information within the user profile is encrypted on a per-claim basis. As such, each portion of the identification information is individually encrypted such that the information can be used on a per-claim basis rather than accessing and decrypting all of the user's identification information. The encryption process is performed using a public key of the IDM system. The encrypted dataset is constructed of pairs of identifiers and encrypted data blocks in the form of $D_{user1}=\{\{i_1,E(k_{IDP\text{-}pub},c_1)\} \ldots \{i_n,E(k_{IDP\text{-}pub},c_n)\}\}$. This set is then encrypted with the user key to form $A=E(D_{user1},k_{user1})$. At step 212, the dataset is then sent to the user computer along with the user key. The user's software stores the user key in the local memory (e.g., a local disk drive). Along with the user key, the encrypted dataset is also stored locally.

At step 214, the IDM system creates a hash of the encrypted identification information. The claim data is arranged with associated status information with regard to the validation level of the claim information i.e., government agency verified data has a high status, while self-verified data has a low status. Thus, claim data and associated status of that claim data is arranged in a database such that each user data $D'_{user1}=\{\{(i_1,s_1,c_1)\} \ldots \{i_n,s_n,c_n)\}\}$. For each claim set, the method 200 computes a hash, then discards the claim data. The information that is stored within the IDM system is $D''_{user1}=\{\{i_1,s_1,H((c_{(1)})\} \ldots \{i_n,s_n,H(c_{(n)})\}.\}$. The method 200 stores this hash set within the database of the IDM system. Along with this set, a public key $K_{user1}$ is also stored and associated with the user information. At step 218, the hash information within the dataset and the encryption key are stored within the database of the IDM system. In this manner, the identification information provided by the user is discarded and only hash remains. Thus, any compromise of the IDM system will not permit the identification information of the user to be compromised. The method 200 ends at step 220.

Figure 3:
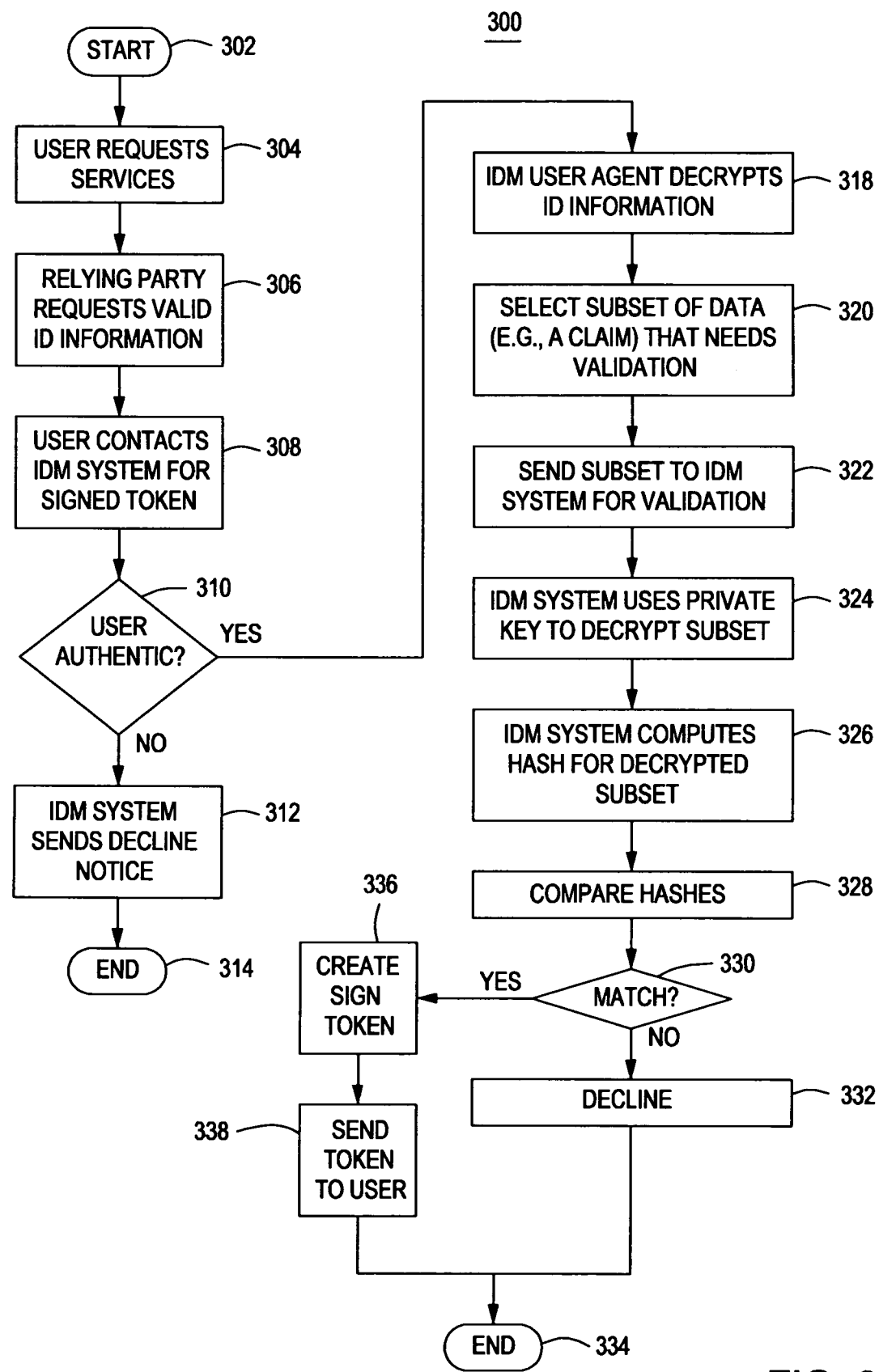
FIG. 3 depicts a token generation process utilized by the system of FIG. 1 in accordance with one embodiment of the present invention.

FIG. 3 depicts a flow diagram of a method 300 that is used for token generation in view of a request from a relying party (e.g., a service provider) that requests such a token to validate and authenticate a user's identification information. When a user interacts with a "relying party" (e.g., a service provider) who desires an identity claim (via such products as CARD-SPACE, OPENID, or any similar protocol), the user computer contacts the IDM system requesting a signed token (or some equivalent validation unit). The method 300 starts at step 302 and proceeds to step 304, where the user computer requests services from a service provider via a communications network. The service provider (the relying party) requests valid identification information from the user computer to enable the service to be provided. At step 308, the user computer contacts the IDM system for a signed token. At step 310, the user is authenticated to ensure that the user that is requesting the token is in fact the proper user. During enrollment the user has been provisioned for authentication depending on the IDM system requirements, the user's preferences, and any regional requirements. Ideally, this system would support multifactor authentication. For example, if the connection is coming from the user's normal machine (determined via fingerprint or other means), their normal IP address range, the machine status seems normal, the account is in good standing, then the IDM system may only ask for a password. If any of the factors (or user preference) indicate more authentication is required, any of the usual methods could be used (OTP generators, SMS, image recognition, and the like). If the user is not authenticated, at step 312, the IDM system sends a decline notice to the user. Method 300 ends at step 314.

If the user is authentic, the method 300 proceeds from step 310 to step 318, where the user's agent uses the user's key to decrypt the claim set A. From this claim set, the agent selects a subset of claim information that requires validation for the particular service provider being accessed. At step 322, this data set $D_{desired}=\{\{i_1,E(k_{IDP\text{-}pub},c_1)\} \ldots \{i_m,E(k_{IDP\text{-}pub},c_m)\}\}$ is sent to the IDM system over a secure channel. First, at step 324, the IDM system uses its private key to decrypt each claim in the set. At step 326, the IDM system computes the hash for each claim within the decrypted claim set. Where the hash claim set becomes $D'_{desired}=\{\{i_1,H(c_1),c_1\} \ldots \{i_m,H(c_m),c_m\}\}$. The IDM system then retrieves the former $D''_{user1}$ information (the set of hashes for user1's claims) from the database. For each claim in $D_{desired}$ the IDM system locates the corresponding claim by means of the identifier $i_n$. At step 328, the method 300 compares the hashes. At step 330, the method 300 queries whether the hashes match. If they match, then the data provided in $D_{desired}$ is the same as the data that was processed at validation time during enrollment and the status of $D''_{user1}$ can be trusted. If the status indicates the claim was validated (or to what extent), the IDM system can now add the claim $C_N$ to the set of signed claims V. Once all the validated claims are processed, the IDM system destroys $D'_{desired}$. The validated set of claims $V=\{\{\{i_1,c_1\} \ldots \{i_o,c_o\}\}$ is encrypted along with a timestamp with a public key provided by the user (normally the key of the relying party) $K_{RP-pub}$. At step 336, this encrypted data is then signed with the private key of the IDM system. Alternatively, the set of claims is signed and then encrypted. As such, the IDM system now contains an encrypted, signed data set of the form $V'=S(E(V,k_{RP-pub}),k_{IDP-priv})$. At step 338, the signed encrypted data is then sent to the user computer to be used as the signed identity token when interacting with the service provider. The method 300 ends at step 334.

Using the method 300, the invention has created a signed identity token, for the model used by CARDSPACE (and other identity validation providers), and the IDM system is not storing, in a long-term manner, any of the identity claim information of the user. The user computer stores this information only in an encrypted form. The key to the encrypted data is never stored on the user's computer but is stored within the IDM system only and is only accessible through strong authentication. Even the user key, however, is not sufficient to recover the core data. Only a combination of the private key of the IDM system and the user can do this. This model virtually eliminates the risk of data compromise at the IDM system and still provides signed tokens that work with current models of identification validation and authentication such that no change is required by the relying party in using the invention. All the operations performed on the user's computer is easily automated so as to be transparent to the user.

Consider a risk analysis of this system. In order to steal an identity, an attacker must first steal the encrypted data. Likely, this would be by means of physical theft, though it's possible some malware could locate and export the data. At this point, the attacker has only encrypted data. The attacker must now obtain the key to be able to decrypt the data. They must somehow forge the user authentication data to obtain the key. It's possible the attacker might use keystroke loggers to obtain weak form authentication (e.g., passwords) despite best attempts to prevent such theft. If the attacker uses the data from a different machine, location, and the like, the IDM system would require a second factor authentication so that the attacker must forge this as well. This also assumes the attacker can do this before the user reports the loss. At this point, all the attacker has in their possession is the encrypted claim data and the identifiers. They still need the private key of the IDM system to access the actual data within the encrypted files. If, in the worst case, they can access the private key via stolen cell phone and sufficient background information, they may manage to steal one user's worth of data. This is far better then the loss of millions of users' worth of data if all the data was available within the IDM system in an unencrypted form or even in an easily encrypted form. If an attacker attacked the IDM system rather than accessing the user's data, the access would only provide the hashed information and user keys. This information is still not useful to enable an attacker to access the actual user's identification information.

A possible variation of the invention is to not locally encrypt the data with the user's specific key and rely only on the encryption within the IDM system private key. This is less secure, as an attacker could see what information is in the local store though it would be easier to implement than the embodiment described above. It is also possible to only encrypt the data using the user key and not use the IDM system private key. This again is less secure, but guarantees that the user access to their data (assuming the user key is escrowed somewhere) without needing the IDM system private key.

What is claimed is:

1. An apparatus for validating identity claims comprising:
an identification management system comprising at least one hardware processor and at least one memory coupled to the at least one hardware processor, the identification management system configured to:
receive at least one identity claim;
validate the at least one identity claim using a hash of verified identification information without using stored identification information, wherein the hash is created based at least in part on identification information supplied by a user, wherein the hash is stored in the at least one memory, and wherein the identification information supplied by the user is discarded; and
create a signed token using the hash based on the validated at least one identity claim, wherein the signed token supports multifactor authentication.

2. The apparatus of claim 1 further comprising a user computer for storing the signed token.

3. The apparatus of claim 2 further comprising a service provider that processes the signed token when provided by the user computer to authenticate the identity of the user computer.

4. A method of processing identification information comprising:
encrypting, using at least one hardware processor, identification information supplied by a user;
returning an encryption key and the encrypted identification information to the user;
creating a hash of the encrypted identification information based at least in part on identification information supplied by the user;
discarding the encrypted identification information and the identification information;
storing the hash and a private encryption key in an identification management system for validating at least one identity claim using at least one of the hash and the private encryption key without using stored identification information; and
creating a signed token using the hash in the event the at least one identity claim is validated, wherein the signed token supports multifactor authentication.

5. The method of claim 4 further comprising:
providing the identification information from a user; and
verifying the veracity of the identification information prior to encrypting the identification information.

6. The method of claim 4 wherein the identification information comprises a plurality of claims, and the encrypting step further comprises separately encrypting each claim in the plurality of claims.

7. The method of claim 4 further comprising:
receiving, at the identification management system, a request from a user for a signed token as an indicia of the veracity of specific identity claims related to the identification information;
sending a key to the requesting user;
user decrypts encrypted identification information;

user selects at least one specific claim requiring validation;

user sends to the identification management system the at least one specific claim;

identification management system uses the private encryption key to decrypt the at least one specific claim;

identification management system computes a hash for the decrypted at least one specific claim;

comparing the hash for the at least one specific claim to the stored hash; and creating the signed token if the hashes match.

8. The method of claim 7 further comprising authenticating the user upon receiving the request for a signed token.

9. The method of claim 7 further comprising sending the signed token to the user.

10. A system for performing a secure transaction comprising:

a user computer coupled to a communication network;

a service provider, coupled to the communications network, for providing services for the user computer through the communications network;

an identification management system, coupled to the communications network, for:

creating a hash based at least in part on identification information supplied via the user computer, storing the hash for the user computer in a memory of the identification management system, discarding the identification information supplied via the user computer, and preparing a signed token based on the hash upon request of the user computer, wherein the signed token supports multifactor authentication.

11. The system of claim 10 wherein the user computer stores the signed token.

12. The system of claim 11 wherein the user computer provides the signed token to the service provider to enable services to be provided to the user computer.

* * * * *